United States Patent [19]
Ichinose

[11] Patent Number: 6,098,644
[45] Date of Patent: Aug. 8, 2000

[54] METHOD AND APPARATUS FOR CONTROLLING DUTY-CYCLE TYPE SOLENOID VALVE

[75] Inventor: Masato Ichinose, Fuji, Japan

[73] Assignee: Jatco Corporation, Japan

[21] Appl. No.: 09/006,752

[22] Filed: Jan. 14, 1998

[30] Foreign Application Priority Data

Jan. 20, 1997 [JP] Japan ..................................... 9-021090

[51] Int. Cl.[7] .................................................. F16K 31/02
[52] U.S. Cl. .......................... 137/1; 251/64; 251/129.05; 361/178
[58] Field of Search ................................ 251/64, 129.05, 251/129.08; 361/160, 178, 179; 137/1

[56] References Cited

U.S. PATENT DOCUMENTS

| | | | |
|---|---|---|---|
| 4,546,795 | 10/1985 | Okamoto et al. | 251/129.05 |
| 4,620,259 | 10/1986 | Oshizawa | 361/152 |
| 4,766,921 | 8/1988 | Williams | 251/129.05 |
| 5,202,813 | 4/1993 | Uota et al. | 251/129.05 |
| 5,323,809 | 6/1994 | Tischer et al. | 251/51 |
| 5,551,480 | 9/1996 | Tomatsu et al. | 251/129.05 |
| 5,749,388 | 5/1998 | Elliot et al. | 251/129.05 |

*Primary Examiner*—Kevin Shaver
*Assistant Examiner*—Eric Keasel
*Attorney, Agent, or Firm*—Rossi & Associates

[57] ABSTRACT

In a method of controlling a duty-cycle type solenoid valve having a valve body that is driven at a controlled duty ratio and a valve seat on which the valve body rests when the solenoid valve is closed, an additional pulse is applied to the solenoid valve upon a lapse of a predetermined time from an ON/OFF switching point at which a level of a driving pulse is changed to drive the valve body in a direction to close the solenoid valve, so as to reduce the speed of the valve body when resting on the valve seat. The additional pulse has the same phase as the driving pulse applied before the ON/OFF switching point, and has a pulse width that is smaller than that of the driving pulse having the same phase. An apparatus for controlling a duty-cycle type solenoid valve is also provided which includes a driving pulse generating device for generating the driving pulse to the duty-cycle type solenoid valve at a predetermined duty ratio, and an additional pulse generating device for generating the additional pulse to the duty-cycle type solenoid valve upon a lapse of a predetermined time from the ON/OFF switching point of the driving pulse generated by the driving pulse generating device.

16 Claims, 9 Drawing Sheets

|  |  | C18 | C20 | C22 | C24 | B28 | B26 | OWC 30 | OWC 29 |
|---|---|---|---|---|---|---|---|---|---|
| D-Range | 1st |  |  | ○ |  |  |  | ○ | ○ |
|  | 2nd |  |  | ○ |  | ○ |  | ○ |  |
|  | 3rd |  | ○ | ○ |  |  |  | ○ |  |
|  | 4th |  | ○ |  |  | ○ |  |  |  |
| Engine Brake | 1st |  |  |  | ○ |  | ○ |  |  |
|  | 2nd |  |  |  | ○ | ○ |  |  |  |
|  | 3rd |  | ○ |  | ○ |  |  |  |  |
|  | 4th |  | ○ |  |  | ○ |  |  |  |
| Reverse |  | ○ |  |  |  |  | ○ |  |  |

METHOD AND APPARATUS FOR CONTROLLING DUTY-CYCLE TYPE SOLENOID VALVE

BACKGROUND OF THE INVENTION

1. Field of the Invention

The present invention relates to a method and an apparatus for controlling a duty-cycle type solenoid valve used in a hydraulic apparatus for a motor vehicle, for example.

2. Description of the Prior Art

A known example of apparatus for controlling a duty-cycle type solenoid valve is employed in a hydraulic apparatus for a motor vehicle as disclosed in Japanese laid-open patent publication No. 3-9169.

In the known control apparatus, a control unit for an automatic transmission (hereinafter abbreviated to "A/T") controls the ON/OFF state of a line pressure solenoid valve so as to control a throttle pressure, when a throttle sensor detects a throttle opening (or a degree of depression of an accelerator pedal) and transmits an output voltage signal representing the throttle opening to the A/T control unit. Then, the A/T control unit controls a pressure regulator valve using this throttle pressure as a signal pressure, so as to regulate a working oil pressure delivered by an oil pump to a line pressure whose level is most suitable for the current running condition of the vehicle.

The line pressure solenoid valve is repeatedly placed in its ON and OFF states at a frequency of 50 Hz, for example, thereby to open and close a drain path to control the throttle pressure to a desired level. As this line pressure solenoid valve, a duty-cycle type solenoid valve may be used, in which the ON duration and OFF duration in one cycle can be freely controlled in a range of 0 to 100%.

In the known duty-cycle type solenoid valve (line pressure solenoid valve) as described above, a shut-off valve that is included in the solenoid valve and uses a needle as a valve body moves rapidly to close the drain path, and therefore the oil pressure P in a pipe is rapidly increased to a high level (PS) due to the inertia force of oil in the pipe, at the moment "ts" when the drain path is closed by the valve body, as shown in FIG. 12. As a result, vibrations (oil vibrations) may arise in the oil path due to water hammer phenomena.

Also, when the drain path is closed by the shut-off valve of the solenoid valve, the valve body hits a valve seat, and causes noise due to collision between the valve body and the valve seat, and vibrations at a location where the solenoid valve is installed, which result in reduced durability of the solenoid valve.

Further, since the valve body also moves rapidly to open the solenoid valve, large shocks may occur due to abutting contact between the valve body and a stopper on which the valve body rests when opening the valve.

SUMMARY OF THE INVENTION

It is therefore an object of the present invention to provide a method and an apparatus for controlling a duty-cycle type solenoid valve, wherein a valve body is moved at a slower speed to open and close the valve, thereby to reduce oil vibrations and noises that may occur at the moment when the valve is closed or opened, while assuring improved durability of the solenoid valve.

To accomplish the above object, there is provided according to the first aspect of the present invention a method of controlling a duty-cycle type solenoid valve having a valve body that is driven at a controlled duty ratio and a valve seat on which the valve body rests when the solenoid valve is closed, wherein an additional pulse is applied to the solenoid valve upon a lapse of a predetermined time from an ON/OFF switching point at which a level of a driving pulse is changed to drive the valve body in a direction to close the solenoid valve, so as to reduce a speed of the valve body when resting on the valve seat. The additional pulse has the same phase as the driving pulse applied before the ON/OFF switching point, and has a pulse width that is smaller than that of the driving pulse having the same phase.

In the control method as described above, when the valve body is moved in a direction to close the solenoid valve by switching the ON/OFF state of the valve, an additional pulse is applied to the valve the above predetermined time after the switching point, so that the valve body is moved for a moment in a direction to open the solenoid valve. As a result, the speed of the valve body moving in the direction to close the valve is lowered. Accordingly, shocks that may arise upon abutting contact between the valve body and the valve seat can be reduced, which leads to reduced vibrations in the oil path and reduced operating noise of the valve.

According to the second aspect of the present invention, there is provided a method of controlling a duty-cycle type solenoid valve having a valve body that is driven at a controlled duty ratio, and a stopper on which the valve body rests when the solenoid valve is opened, wherein an additional pulse is applied to the solenoid valve upon a lapse of a predetermined time from an ON/OFF switching point at which a level of a driving pulse is changed to drive the valve body in a direction to open the valve, so as to reduce a speed of the valve body when resting on the stopper. The additional pulse has the same phase as the driving pulse applied before the ON/OFF switching point, and has a pulse width that is smaller than that of the driving pulse having the same phase.

In the control method as described above, when the valve body is moved in a direction to open the solenoid valve by switching the ON/OFF state of the valve, an additional pulse is applied to the valve the above predetermined time after the switching point, so that the valve body is moved for a moment in a direction to close the solenoid valve. As a result, the speed of the valve body moving in the direction to open the valve is lowered, and shocks due to collision between the valve body and the stopper can be reduced.

According to the third aspect of the invention, there is provided a control apparatus for controlling a duty-cycle type solenoid valve having a valve body that is driven at a controlled duty ratio so as to control an oil pressure in a hydraulic circuit, which comprises: driving pulse generating means for generating a driving pulse to the duty-cycle type solenoid valve at a predetermined duty ratio; and additional pulse generating means for generating an additional pulse to the duty-cycle type solenoid valve upon a lapse of a predetermined time from an ON/OFF switching point of the driving pulse generated by the driving pulse generating means. The additional pulse has the same phase as the driving pulse applied before the ON/OFF switching point, and has a smaller pulse width than that of the driving pulse having the same phase.

In the control apparatus constructed as described above, when the driving pulse generating means outputs driving pulses at a given duty ratio to the duty-cycle type solenoid valve so as to control the oil pressure to a desired level, the additional pulse generating means outputs an additional pulse having a smaller pulse width to the solenoid valve a predetermined time after the ON/OFF switching point of each driving pulse.

In the control apparatus as described above, the ON/OFF switching point of the driving pulse may be a switching point at which a level of the driving pulse is changed to drive the valve body in a direction to close the duty-cycle type solenoid valve, or may be a switching point at which a level of the driving pulse is changed to drive the valve body in a direction to open the duty-cycle type solenoid valve. Further, the ON/OFF switching point of the driving pulse may be both of the switching point at which a level of the driving pulse is changed to drive the valve body in a direction to close the duty-cycle type solenoid valve, and a switching point at which the level of the driving pulse is changed to drive the valve body in a direction to open the solenoid valve.

If the additional pulse generating means outputs an additional pulse a predetermined time after the ON/OFF switching point at which the level of the driving pulse is changed to drive the valve body to close the solenoid valve, the valve body is moved for a moment in the direction to open the valve during movement of the valve body in the closing direction, whereby the speed of the valve body moving in the closing direction is lowered, and shocks upon abutting contact between the valve body and the valve seat are reduced.

If the additional pulse generating means outputs an additional pulse a predetermined time after the ON/OFF switching point at which the level of the driving pulse is changed to drive the valve body to open the solenoid valve, the valve body is moved for a moment in the direction to close the valve during movement of the valve body in the opening direction, whereby the speed of the valve body moving in the opening direction is lowered, and shocks upon abutting contact between the valve body and the stopper can be reduced.

In one preferred form of the third aspect of the invention, the predetermined time is determined depending upon the duty ratio of the driving pulse. In particular, the predetermined time is preferably set to a longer period as an oil pressure that corresponds to the duty ratio is increased. In this case, shocks can be appropriately reduced in accordance with the oil pressure that is being controlled.

In another preferred form of the third aspect of the invention, the pulse width of the additional pulse is set to a larger value as the predetermined time is set to be a shorter period when an oil pressure is low, and is set to a larger value as the predetermined time is set to be a longer period when the oil pressure is high. In this case, the additional pulses are particularly effective to reduce shocks.

In a further preferred form of the third aspect of the invention, the additional pulse generating means outputs the additional pulse when an oil pressure that corresponds to the duty ratio is not higher than a predetermined level.

BRIEF DESCRIPTION OF THE DRAWINGS

The invention will be described in greater detail with reference to certain preferred embodiments thereof and the accompanying drawings, wherein.

DETAILED DESCRIPTION OF THE PREFERRED EMBODIMENTS

The first embodiment of the present invention will be described wherein this invention is applied to control of a line pressure solenoid valve used in a hydraulic system of an automatic transmission for a motor vehicle.

For easier understanding, a power transmitting system of the automatic transmission will be first described.

Figure 1:
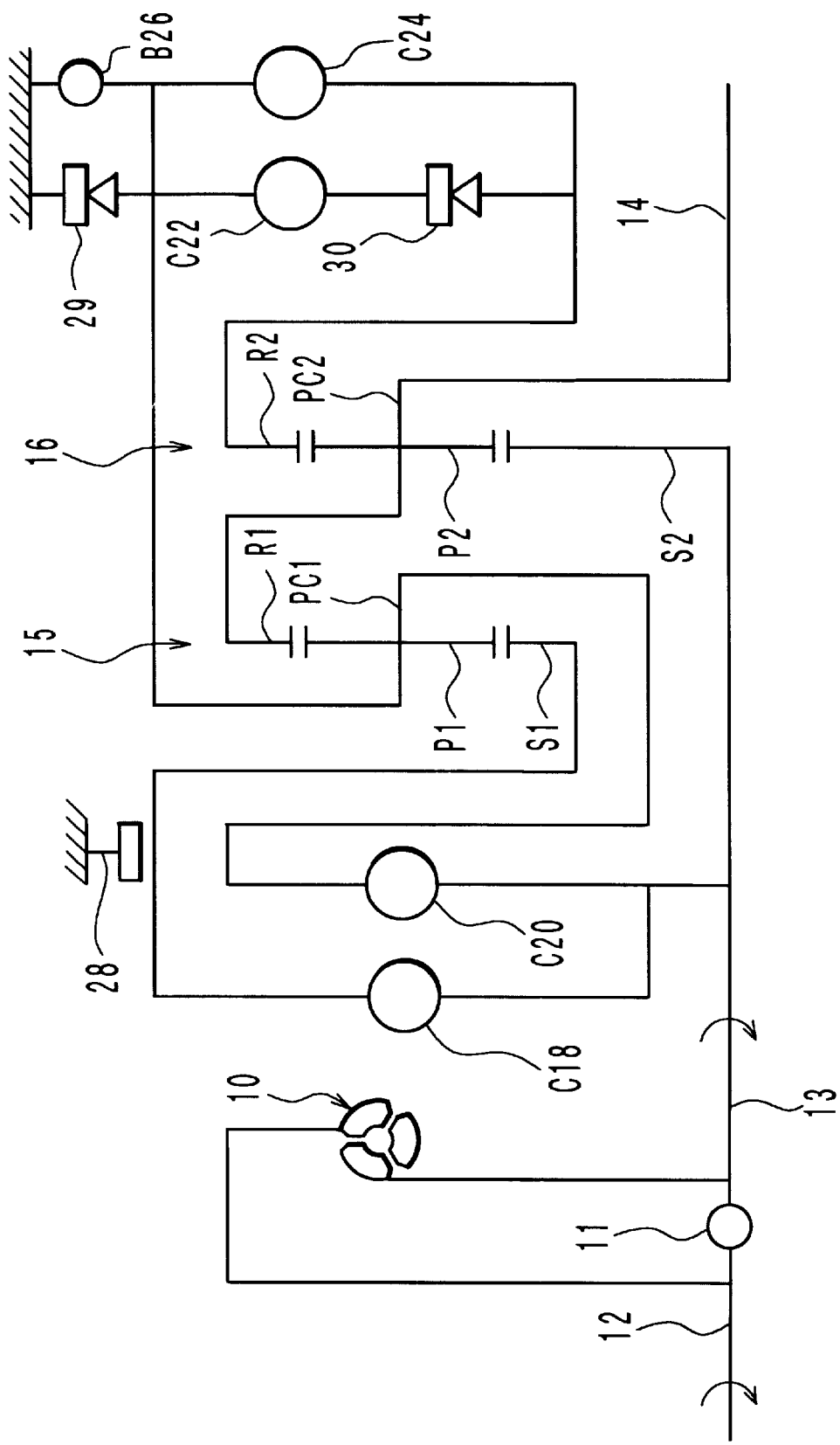
FIG. 1 is a view schematically showing a power transmitting system of an automatic transmission for a motor vehicle.

FIG. 1 is a view schematically showing a power transmitting system of a forward 4-speed and reverse 1-speed automatic transmission equipped with an overdrive gear position. In the power transmitting system, an input shaft 13 receives rotary driving force from an output shaft 12 of the engine via a torque converter 10, and the received driving force is transmitted to an output shaft 14 and then to a final drive device. A lock-up clutch 11 establishes direct connection between the engine output shaft 12 and the input shaft 13. The power transmitting system further includes first planetary gear set 15, second planetary gear set 16, reverse clutch 18, high clutch 20, forward clutch 22, overrunning clutch 24, low and reverse brake 26, band brake 28, low one-way clutch 29 and forward one-way clutch 30.

The first planetary gear set 15 is composed of a sun gear S1, internal gear R1, pinion gear P1 that engages with both of these gears S1, R1, and a carrier PC1 that supports the pinion gear P1. The second planetary gear set 16 is composed of a sun gear S2, internal gear R2, pinion gear P2 that engages with both of these gears S2, R2, and a carrier PC2 that supports the pinion gear P2.

The carrier PC1 can be coupled to the input shaft 13 through the high clutch 20, and the sun gear S1 can be also coupled to the input shaft 13 through the reverse clutch 18. The carrier PC1 can be coupled to the internal gear R2, through the forward clutch 22 and the forward one-way clutch 30 connected in series with the forward clutch 22, or through the overrunning clutch 24 disposed in parallel with the forward clutch 30.

The sun gear S2 is constantly coupled to the input shaft 13, and the internal gear R1 and carrier PC2 are constantly coupled to the output shaft 14. The low and reverse brake 26 is able to fix or inhibit rotation of the carrier PC1, and the band brake 28 is able to fix the sun gear S1. The low one-way clutch 29 is constructed so as to allow normal or forward rotation of the carrier PC1 but inhibit its reverse rotation.

In the power transmitting system constructed as described above, the clutches 18, 20, 22, 24 and brakes 26, 28 serving as engaging elements are operated in various combinations so as to change the rotating states of respective elements of the planetary gear sets 15, 16, thereby to change the ratio of the rotating speed of the output shaft 14 to that of the input shaft 13.

Figures 2, 3:
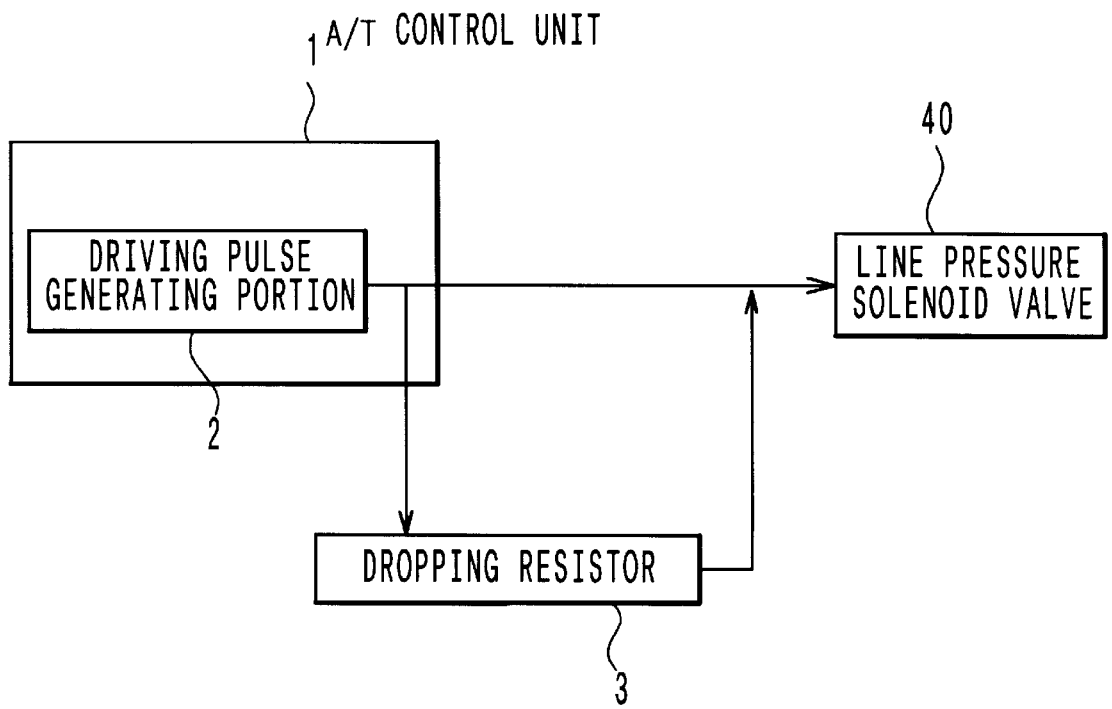
FIG. 2 is a view showing combinations of engaging elements that operate to establish various gear positions of the automatic transmission of FIG. 1.
FIG. 3 is a view showing the construction of the first embodiment of the present invention.

Namely, the clutches 18, 20, 22, 24 and brakes 26, 28 are operated in those selected combinations as indicated in FIG. 2, so that the transmission can be selectively placed in one of forward 4-speed and reverse 1-speed gear positions. In FIG. 2, "○" indicates that the clutch or brake is to be operated (engaged) to establish the corresponding gear position.

In order to reduce shocks upon engagement of the clutches and brakes as described above, and prevent excessive wear due to slipping upon engagement and release of these elements, an appropriate line pressure needs to be established as a working oil pressure, depending upon the driving conditions, in particular, the magnitude of the torque applied to these elements.

In the present embodiment, therefore, an A/T control unit 1 includes a driving pulse generating portion 2, which receives signals from a throttle sensor (not shown) and other sensors, and outputs driving pulses K to a duty-cycle type line pressure solenoid valve 40. As in the known example, a throttle pressure produced by the line pressure solenoid valve 40 is used as a signal pressure to control a pressure regulator valve, so as to establish a line pressure that is suitable for the current running condition of the vehicle.

Further, a dropping resistor 3 that consists of a monostable multivibrator is provided between the A/T control unit 1 and the line pressure solenoid valve 40. The dropping resistor 3 produces and outputs counter pulses C, so that the counter pulses C as well as the driving pulses K are applied to the line pressure solenoid valve 40.

Figure 4:
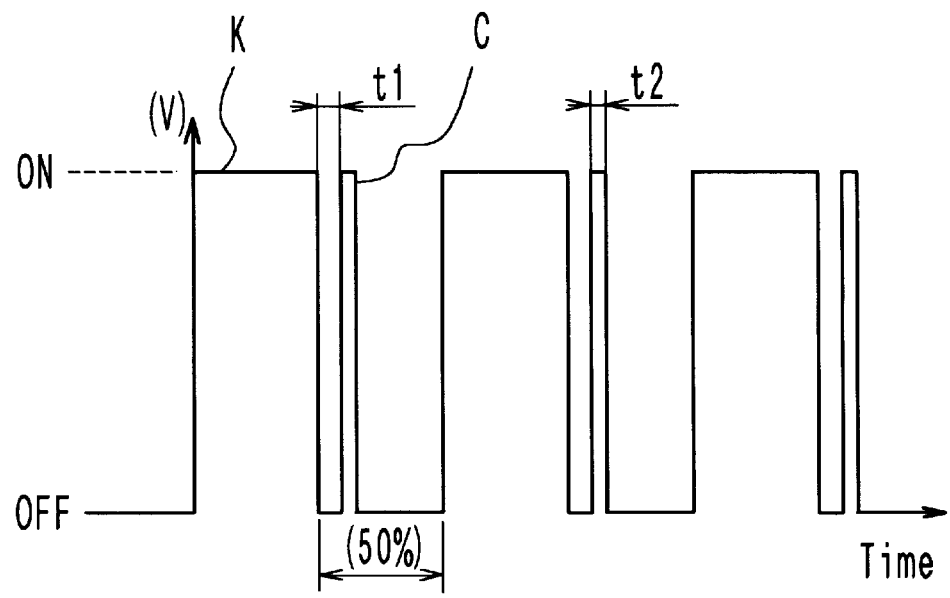
FIG. 4 is a view showing a driving signal that is applied to a line pressure solenoid valve.

FIG. 4 shows an example of a driving signal that is applied to the line pressure solenoid valve 40 when it operates at an OFF duty ratio of 50%. In this example, a counter pulse C having a pulse width of t2 seconds is applied to the solenoid valve 40 with a delay of t1 seconds as measured from a point of time when each driving pulse K falls, namely, from the time when the solenoid valve 40 is switched from its ON state to OFF state. Thus, the counter pulses that bring the solenoid valve 40 to the ON state are inserted while the driving pulses are not applied, namely, while the valve 40 is normally in the OFF period, whereby the speed of closing the valve can be lowered.

Figure 5:
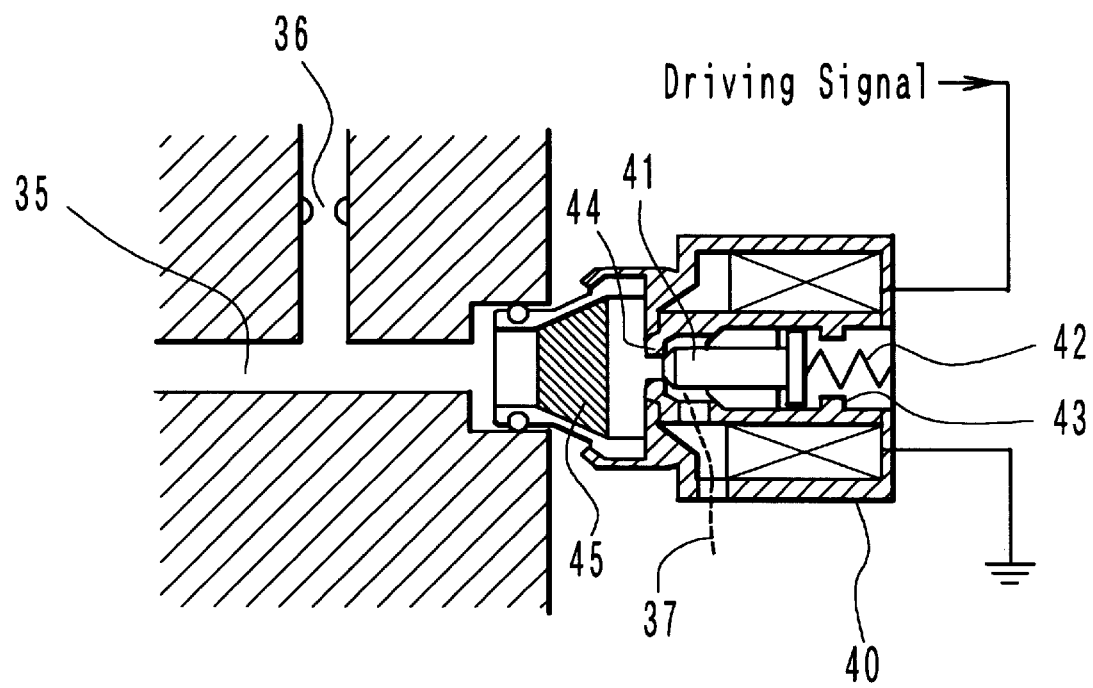
FIG. 5 is a view showing the construction of the line pressure solenoid valve.

FIG. 5 shows the construction of the duty-cycle type line pressure solenoid valve 40. As shown in FIG. 5, a needle 41 that serves as a valve body is biased by a spring 42 toward a valve seat 44 that partially defines an oil path 35. A stopper 43 is provided on the side of the needle 41 opposite the valve seat 44, such that the needle 41 abuts on the stopper 43 when it is moved away from the valve seat 44 to open the solenoid valve.

The line pressure solenoid valve 40 functions to regulate an oil pressure in an oil path 35 to which a constant pilot pressure that is regulated by a pilot valve (not shown) is supplied through an orifice 36. In operation, the line pressure solenoid valve 40 is repeatedly switched ON and OFF at a frequency of 50 Hz, for example, and regulates the oil pressure by controlling the proportion of ON duration and OFF duration in one cycle depending upon the duty ratio. When the line pressure solenoid valve 40 is brought into the OFF state, the needle 41 abuts on the valve seat 44 so as to close a drain path 37 of the pilot pressure.

If the proportion of the OFF duration is increased, therefore, the drain path 37 is closed for an increased period of time, and the throttle pressure is accordingly increased. If the proportion of the OFF duration is reduced, on the other hand, the drain path 37 is closed for a reduced period of time, and the throttle pressure is accordingly reduced. Thus, the oil pressure in the oil path 35 is changed depending upon the duty ratio.

The oil pressure of the oil path 35 acts on a pressure regulator valve via a pressure modifier valve (not shown) and others, and consequently, the line pressure is changed in accordance with the duty ratio.

Namely, when a throttle sensor (not shown) detects a throttle opening (degree of depression of an accelerator pedal), and transmits an output signal to the A/T control unit 1, the A/T control unit 1 controls the line pressure solenoid valve 40 by means of driving pulses generated from its driving pulse generating portion 2, thereby to regulate the throttle pressure. The A/T control unit 1 then controls the pressure regulator valve, using this throttle pressure as a signal, thereby to regulate a working oil delivered by an oil pump into an optimum line pressure that is most suitable for the current running condition of the vehicle. Reference number 45 in FIG. 5 shows a filter.

The dropping resistor 3 operates in response to commands from the A/T control unit 1, to transmit a signal in the form of a counter pulse C having the same phase as the driving pulse K and a smaller pulse width (t2 seconds) than that of the driving pulse K, with a delay of t1 seconds as measured from the time of a fall of each driving pulse K for driving the needle 41 of the line pressure solenoid valve 40, as shown in FIG. 4.

Namely, when the line pressure solenoid valve 40 is brought into its OFF state, a driving pulse K falls so that the needle 41 is moved under a bias force of the spring 42 in a direction to close the drain path 37. Then, upon a lapse of t1 seconds from the time of the fall of the driving pulse K1, a counter pulse C having a pulse width of t2 seconds rises, thereby to bias the needle 41 to in a direction to open the drain path 37. The counter pulse C then falls t2 seconds later, so that the needle 41 is biased again by the spring 42 in a direction in which the needle 41 abuts on the valve seat 44, to thus move in the direction to close the drain path 37.

Figure 6:
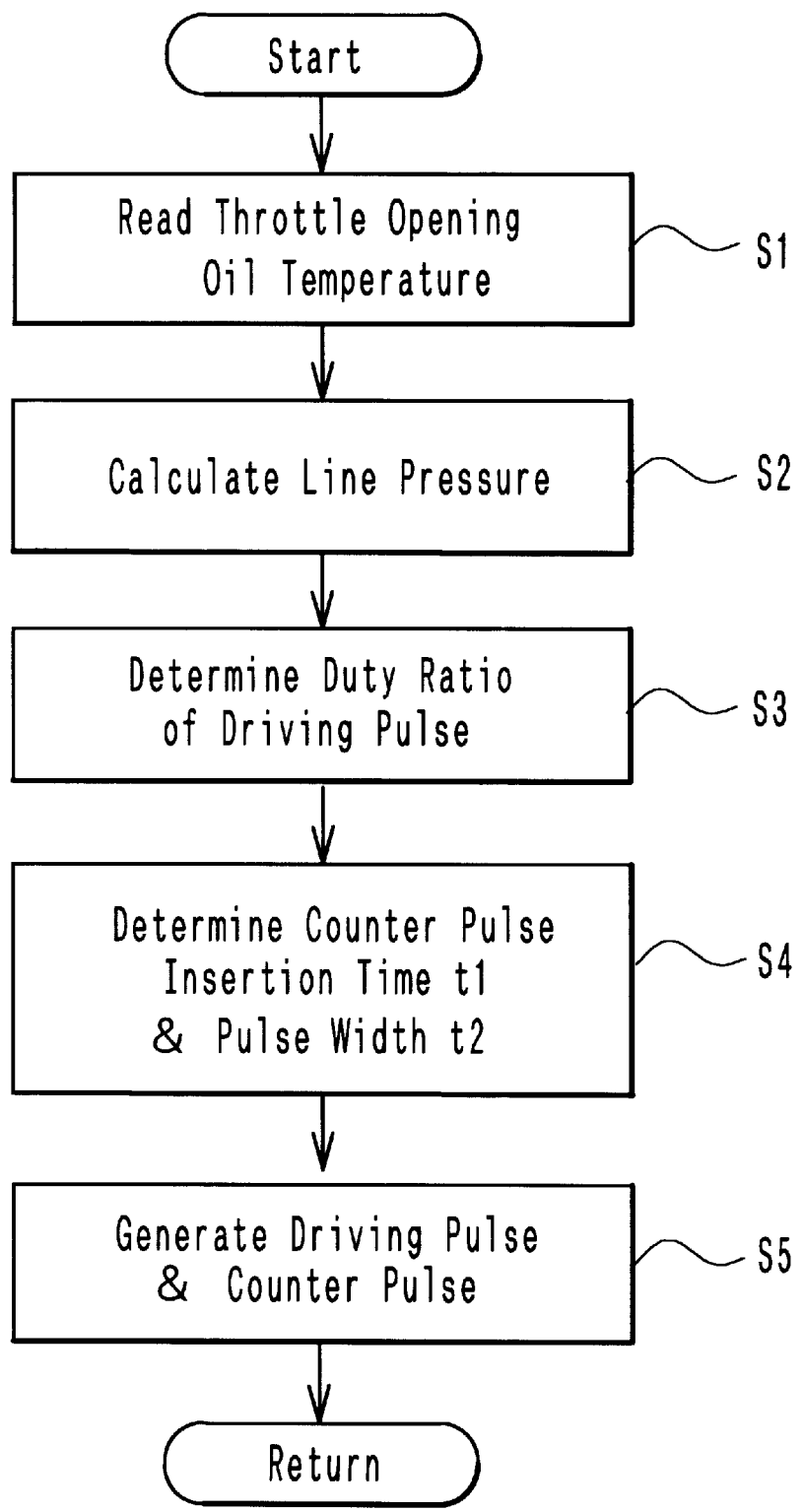
FIG. 6 is a flow chart showing the procedure of generating the driving signal.

FIG. 6 is a flow chart showing the procedure of producing the driving signal as described above.

In step S1, the throttle opening and the oil temperature are read in. In step S2, the line pressure is calculated based on the oil temperature and throttle opening read in step S1.

In step S3, the optimum (best) duty ratio of the driving pulses K is determined based on the line pressure obtained in step S2, using the first map (not shown) that has been prepared in advance.

In the next step S4, the pulse insertion time t1 and pulse width t2 of the counter pulses C are determined based on the duty ratio obtained in step S3, using the second map (not shown) that has been prepared in advance.

In this step, the control of the counter pulses C based on the duty ratio is performed such that the delay time up to a rise of each counter pulse C, or pulse insertion time t1, is set to a longer period as the proportion of the OFF duration in one cycle becomes larger relative to that of the ON duration, namely, as the OFF duty ratio of the driving pulses K is increased.

Figure 7:
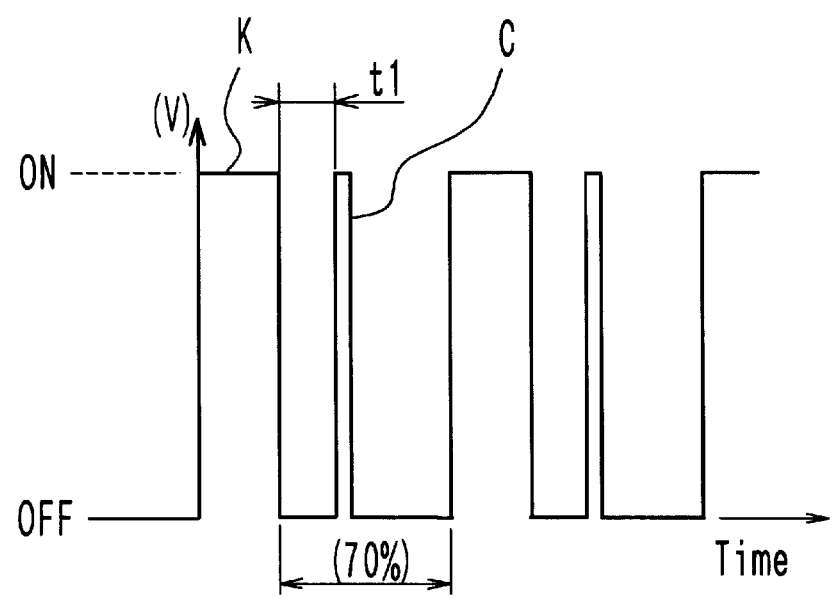
FIG. 7 is a view showing another example of driving signal that is applied to the line pressure solenoid valve when a duty ratio is changed.

FIG. 7 shows a driving signal applied to the line pressure solenoid valve 40 when the OFF duty ratio is 70%. As is understood from FIG. 7, the insertion time t1 of the counter pulses C is larger than that shown in FIG. 4 where the OFF duty ratio is 50%.

In step S5 of FIG. 6, the driving pulses K are generated to the line pressure solenoid valve 40 at the duty ratio determined in the above step S3, and the counter pulses C having the pulse width t2 are also generated to the line pressure solenoid valve 40 with a delay of the pulse insertion time t1 determined as described above, so as to control the ON/OFF state of the line pressure solenoid valve 40.

Figure 8:
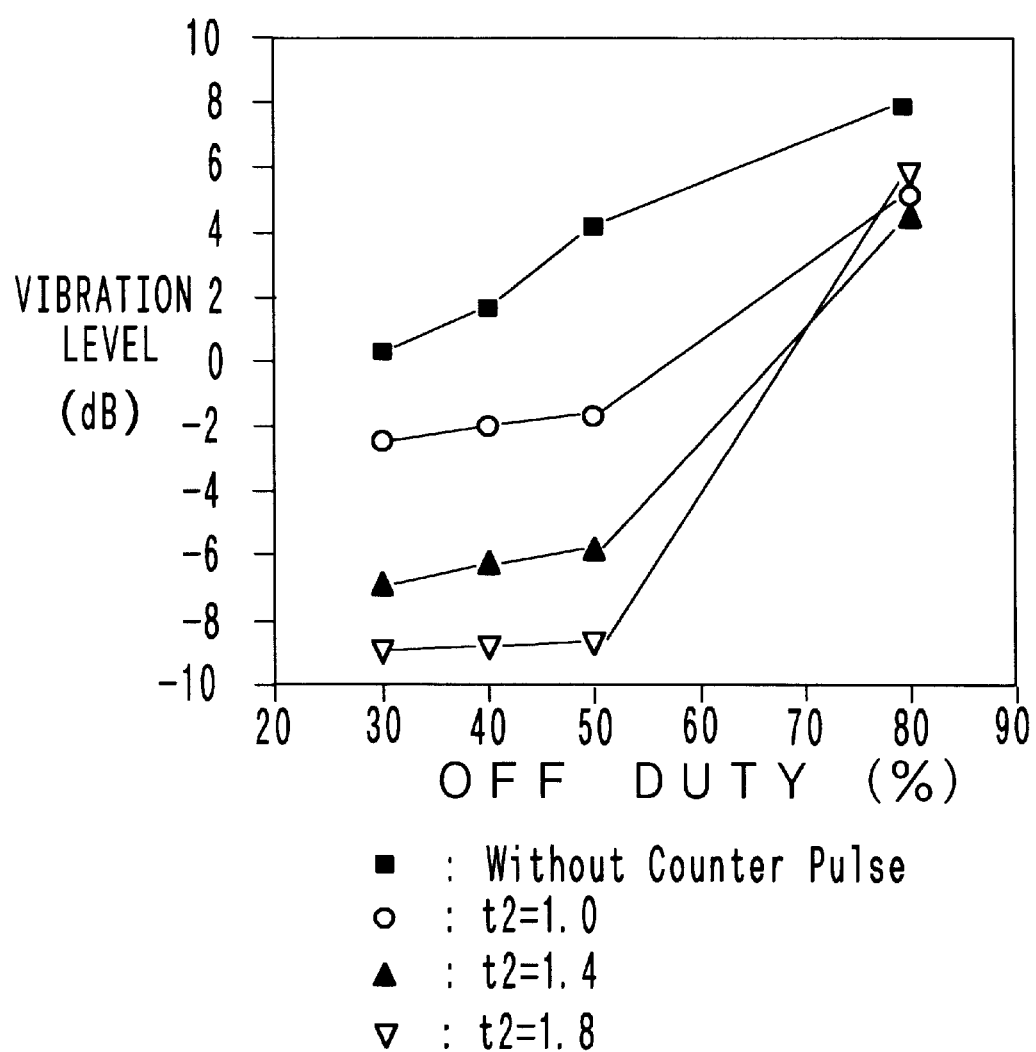
FIG. 8 is a graph showing the relationship between the duty ratio and the insertion time of counter pulses.
Figure 9:
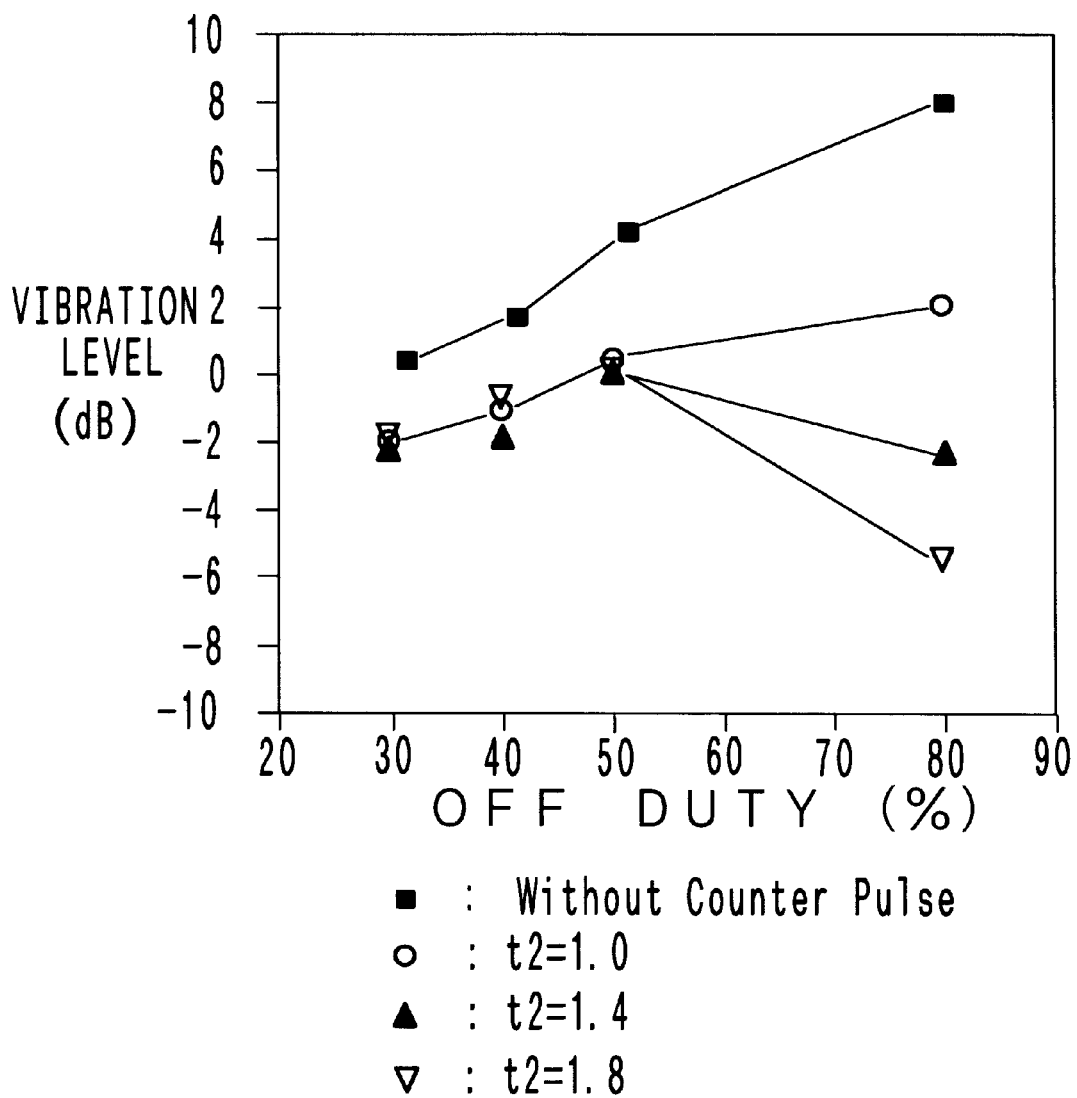
FIG. 9 is a graph showing the relationship between the duty ratio and the insertion time of counter pulses.

FIGS. 8 and 9 are graphs showing in detail the relationships between the duty ratio of the driving pulses and the insertion time t1 of the counter pulses, wherein the horizontal axis represents OFF duty ratio, and the vertical axis represents vibration level detected at a location where the line pressure solenoid valve 40 is installed.

FIG. 8 shows the effect of insertion of the counter pulses with respect to changes in the duty ratio when the counter pulse insertion time t1 is controlled to 0.5 msec. In FIG. 8, ○, ▲, ▽ represent results obtained when the pulse width t2 of the counter pulse C is controlled to 1.0 msec, 1.4 msec, and 1.8 msec, respectively. It will be understood from the graph of FIG. 8 that where the counter pulse insertion time t1 is relatively short, the insertion of the counter pulses C yields a greater effect when the OFF duty ratio is small, and when the pulse width t2 is relatively large.

FIG. 9 shows the effect of insertion of the counter pulses with respect to changes in the duty ratio when the counter pulse insertion time t1 is controlled to 0.9 msec. In FIG. 9, ○, ▲, and ▽ represent results obtained when the pulse width t2 of the counter pulse C is controlled to 1.0 msec, 1.4 msec, and 1.8 msec, respectively. It will be understood from the graph of FIG. 9 that where the counter pulse insertion time t1 is relatively long, the insertion of the counter pulses C yields a greater effect when the OFF duty ratio is large, and when the pulse width t2 is relatively large. Accordingly, in the present embodiment, the pulse width of the counter pulses C is set to a larger value with a reduction in the predetermined pulse insertion time when the oil pressure is relatively low, and is also set to a larger value with an increase in the predetermined pulse insertion time when the oil pressure is relatively high.

Figure 10:
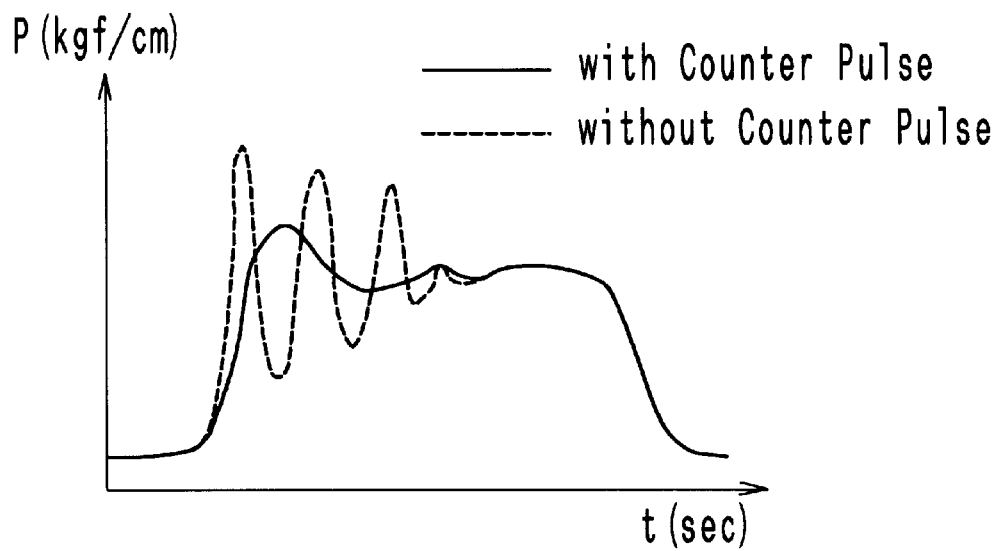
FIG. 10 is a graph showing the effect of reducing oil vibrations due to insertion of counter pulses.

In the present embodiment constructed as described above, changes in the oil pressure are significantly reduced due to insertion of the counter pulses C, as indicated by the solid line in FIG. 10, as compared with changes in the oil pressure as indicated by the broken line in FIG. 10 where no counter pulse is inserted.

With the counter pulses thus inserted, the speed of the needle 41 is lowered at the moment when the drain path 37 is closed, and therefore shocks are reduced when the needle 41 hits the valve seat 44. Consequently, vibrations in the oil path which occur due to water hammer at the moment the needle 41 closes the drain path 37 can be reduced, and the durability of the solenoid valve is improved. In addition, the operating noise of the line pressure solenoid valve is also reduced.

Figure 11:
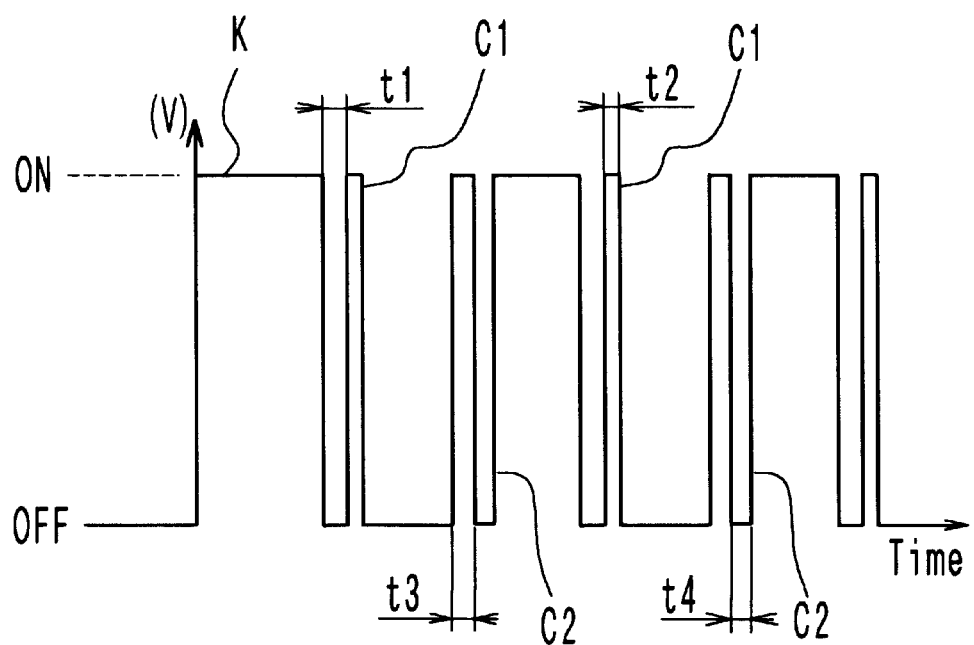
FIG. 11 is a view showing a driving signal in the second embodiment of the invention.
Figure 12:
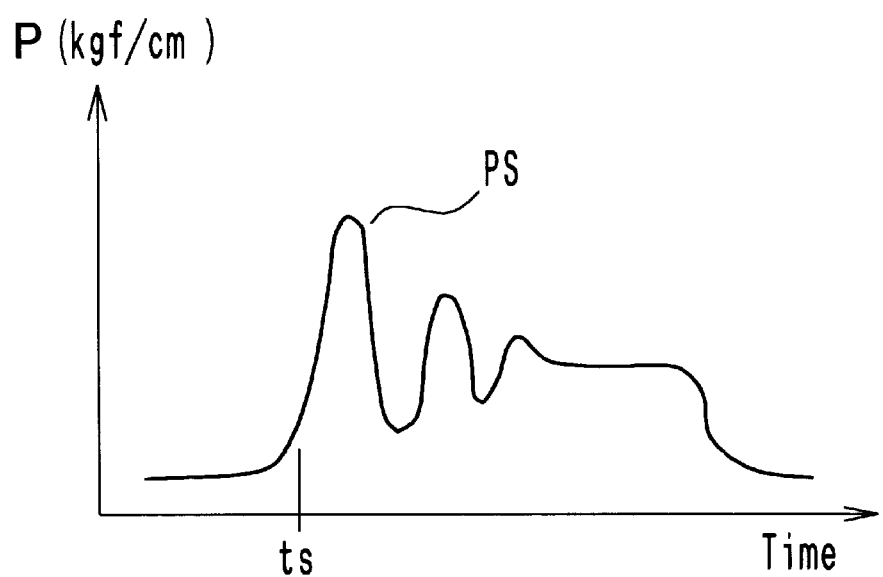
FIG. 12 is a graph illustrating the reason of occurrence of oil vibrations in a known example.

FIG. 11 shows the second embodiment of the present invention, which illustrates another example of driving signal that is applied from the A/T control unit and dropping resistor to the line pressure solenoid valve 40.

In the same manner as in the first embodiment, when the driving pulse generating portion 2 of the A/T control unit 1 outputs driving pulses at a certain duty ratio to the line pressure solenoid valve 40, the dropping resistor outputs a counter pulse C1 having a pulse width of t2 seconds, with a delay of t1 seconds as measured from the time of a fall of each driving pulse K, namely, from the time when the solenoid valve 40 is switched from the ON state to the OFF state.

In the present embodiment, the dropping resistor also outputs a signal in the form of a counter pulse C2 to the line pressure solenoid valve 40, with a delay of t3 seconds as measured from the time when each driving pulse rises, namely, when the solenoid valve 40 is switched ON. The counter pulse C2 has a smaller pulse width of t4 seconds than that of the driving pulse K, and its phase is opposite to that of the driving pulse K.

When the driving pulse K rises, and the line pressure solenoid valve 40 is placed in the ON state, the needle 41 of the line pressure solenoid valve 40 starts moving in the direction to open the solenoid valve. Upon a lapse of t3 seconds from this moment, the line pressure solenoid valve 40 is momentarily brought into the OFF state by the counter pulse C2, and the needle 41 is biased in the direction to close the valve. Then, after the duration of t4 seconds, the needle 41 of the valve 40 is moved again in the direction to open the solenoid valve.

With the counter pulses C2 thus applied, the speed of the needle 41 when opening the valve is reduced, and shocks due to collision between the needle 41 and the stopper 43 are reduced. Accordingly, the durability of colliding members, such as the valve and stopper, is improved.

The effect of the counter pulses C1 that are inserted with a delay of t1 seconds from the time of fall of the driving pulses is the same as that of the first embodiment.

The insertion time t3 of the counter pulses C2 may be varied depending upon the duty ratio as in the case of the insertion time t1 of the counter pulse C1.

In the illustrated embodiments, the line pressure solenoid valve 40 is opened when it is turned ON, and is closed when it is turned OFF. The present invention, however, is not limited to this type of line pressure solenoid valve, but may be applied to another type of solenoid valve that is closed when it is turned ON, and is closed when it is turned OFF.

While the insertion times t1, t3 of the counter pulses, and the like, are varied depending upon the duty ratio of the driving pulses in the illustrated embodiments, they may be determined on the basis of the oil temperature or throttle opening, for example.

While the counter pulses, or additional pulses, are inserted in the whole range of duty ratio in the illustrated embodiment, the additional pulses may be generated only when the oil pressure corresponding to the duty ratio is equal to or lower than a predetermined level. This arrangement is sufficient to eliminate noises of the solenoid valve that are often noticeably recognized when the vehicle is in a coasting state, for example.

While the line pressure solenoid valve is illustrated as an example of duty-cycle type solenoid valve in the above embodiments, the present invention is not limited to this example, nor limited to such a valve that employs a needle as a valve body.

In the illustrated embodiments, the counter pulses are generated by the dropping resistor that is provided separately from the A/T control unit. However, the function of the dropping resistor may be incorporated in the A/T control unit, or the driving pulse generating portion 2 may be adapted to generate counter pulses as well as driving pulses.

In the method of the first aspect of the invention for controlling a duty-cycle type solenoid valve having a valve body that is driven at a controlled duty ratio and a valve seat on which the valve body rests when the solenoid valve is closed, an additional pulse is applied to the solenoid valve upon a lapse of a predetermined time from an ON/OFF switching point at which a level of a driving pulse is changed to drive the valve body in a direction to close the solenoid valve, so as to reduce a speed of the valve body when resting on the valve seat. The additional pulse has the same phase as the driving pulse applied before the ON/OFF switching point, and has a pulse width that is smaller than that of the driving pulse having the same phase. Accordingly, the speed of the valve body moving in the closing direction is lowered when the valve body abuts on the valve seat, leading to reduced oil vibrations that arise due to water hammers at the moment when the valve is closed. In addition, the operating noise and impulsive sound of the solenoid valve are reduced, and the durability of the solenoid valve is advantageously improved.

In the method of the second aspect of the invention for controlling a duty-cycle type solenoid valve having a valve body that is driven at a controlled duty ratio, and a stopper on which the valve body rests when the solenoid valve is opened, an additional pulse is applied to the solenoid valve upon a lapse of a predetermined time from an ON/OFF switching point at which a level of a driving pulse is changed to drive the valve body in a direction to open the valve, so as to reduce a speed of the valve body when resting on the stopper. The additional pulse has the same phase as the driving pulse applied before the ON/OFF switching point, and has a pulse width that is smaller than that of the driving pulse. Accordingly, the speed of the valve body moving in the opening direction is lowered when the valve body abuts on the stopper, which leads to reduced operating noise and impulsive sound of the solenoid valve, and improved durability of the valve.

The control apparatus of the present invention for controlling a duty-cycle type solenoid valve having a valve body that is driven at a controlled duty ratio so as to control an oil pressure in a hydraulic circuit includes driving pulse generating means for generating a driving pulse to the duty-cycle type solenoid valve at a predetermined duty ratio, and additional pulse generating means for generating an additional pulse to the duty-cycle type solenoid valve upon a lapse of a predetermined time from an ON/OFF switching point of the driving pulse generated by the driving pulse generating means. The additional pulse has the same phase as the driving pulse applied before the ON/OFF switching point, and has a smaller pulse width than that of the driving pulse having the same phase. In this arrangement, impulsive sound or noise, and the like, can be effectively reduced by controlling the speed of the valve body upon switching operations of the solenoid valve.

If the additional pulse is generated the above predetermined time after the ON/OFF switching point at which the level of the driving pulse is changed to drive the valve body to close the solenoid valve, the valve body is moved for a moment in the direction to open the valve during movement of the valve body in the closing direction, whereby shocks that may occur upon abutting contact of the valve body with the valve seat are reduced, and oil vibrations due to water hammers that occur at the moment when the valve is closed are also reduced. In addition, operating noise and impulsive sound of the solenoid valve are reduced, and the durability of the valve is improved.

If the additional pulse is generated the above predetermined time after the ON/OFF switching point at which the level of the driving pulse is changed to drive the valve body to open the solenoid valve, the valve body is moved for a moment in the direction to close the valve during movement of the valve body in the opening direction, whereby shocks that may arise upon abutting contact of the valve body with the stopper can be reduced.

When the predetermined time measured from the ON/OFF switching point up to the time of insertion of the additional pulse is set to be longer with an increase in an oil pressure corresponding to the duty ratio of the driving pulse, shocks can be appropriately reduced in accordance with the oil pressure that is being controlled.

When the pulse width of the additional pulse is set to a larger value as the predetermined time is set to be a shorter period when an oil pressure is low, and set to a larger value as the predetermined time is set to be a longer period when the oil pressure is high, the additional pulses are particularly effective to reduce shocks.

What is claimed is:

1. A method of controlling a duty-cycle type solenoid valve having a valve body that is driven at a controlled duty ratio and a valve seat on which said valve body rests when the solenoid valve is closed, wherein an additional pulse is applied to the solenoid valve upon a lapse of a predetermined time from an ON/OFF switching point wherein said predetermined time is determined depending upon the duty ratio of a driving pulse at which a level of the driving pulse is changed to drive said valve body in a direction to close the solenoid valve, so as to reduce a speed of said valve body when resting on said valve seat, said additional pulse having the same phase as said driving pulse applied before the ON/OFF switching point, and having a pulse width that is smaller than that of the driving pulse having the same phase.

2. The method of controlling a duty-cycle type solenoid valve disclosed in claim 1, wherein said predetermined time is set to a longer period as an oil pressure that corresponds to the duty ratio is increased.

3. The method of controlling a duty-cycle type solenoid valve disclosed in claim 1, wherein the pulse width of said additional pulse is set to a larger value as said predetermined time is set to be a shorter period when an oil pressure is low, and is set to a larger value as said predetermined time is set to be a longer period when the oil pressure is high.

4. The method of controlling a duty-cycle type solenoid valve disclosed in claim 1, wherein said additional pulse generating means generates said additional pulse when an oil pressure that corresponds to the duty ratio is not higher than a predetermined level.

5. A method of controlling a duty-cycle type solenoid valve having a valve body that is driven at a controlled duty ratio, and a stopper on which said valve body rests when the solenoid valve is opened, wherein an additional pulse is applied to the solenoid valve upon a lapse of a predetermined time from an ON/OFF switching point at which a level of a driving pulse is changed to drive the valve body in a direction to open the valve, so as to reduce a speed of said valve body when resting on said stopper, said additional pulse having the same phase as said driving pulse applied before the ON/OFF switching point, and having a pulse width that is smaller than that of the driving pulse having the same phase.

6. The method of controlling a duty-cycle type solenoid valve disclosed in claim 5, further comprising a valve seat on which the valve body rests when the solenoid valve is closed, wherein an additional pulse is applied to the solenoid valve upon a lapse of a predetermined time from an ON/OFF switching point at which a level of a driving pulse is changed to drive the valve body in a direction to close the solenoid valve, so as to reduce a speed of the valve body when resting on the valve seat, the additional pulse having the same phase as the driving pulse applied before the ON/OFF switching point, and having a pulse width that is smaller than that of the driving pulse having the same phase.

7. The method of controlling a duty-cycle type solenoid valve disclosed in claim 6, wherein said predetermined time is determined depending upon the duty ratio of said driving pulse.

8. The method of controlling a duty-cycle type solenoid valve disclosed in claim 7, wherein said predetermined time is set to a longer period as an oil pressure that corresponds to the duty ratio is increased.

9. The method of controlling a duty-cycle type solenoid valve disclosed in claim 7, wherein the pulse width of said additional pulse is set to a larger value as said predetermined time is set to be a shorter period when an oil pressure is low, and is set to a larger value as said predetermined time is set to be a longer period when the oil pressure is high.

10. The method of controlling a duty-cycle type solenoid valve disclosed in claim 7, wherein said additional pulse generating means generates said additional pulse when an oil pressure that corresponds to the duty ratio is not higher than a predetermined level.

11. An apparatus for controlling a duty-cycle type solenoid valve having a valve body that is driven at a controlled duty ratio so as to control an oil pressure in a hydraulic circuit, comprising:

driving pulse generating means for generating a driving pulse to the duty-cycle type solenoid valve at a predetermined duty ratio; and additional pulse generating means for generating an additional pulse to the duty-cycle type solenoid valve upon a lapse of a predetermined time from an ON/OFF switching point of said driving pulse generated by said driving pulse generating means, said additional pulse having the same phase as the driving pulse applied before said ON/OFF switching point, and having a smaller pulse width than that of the driving pulse having the same phase, wherein said ON/OFF switching point of said driving pulse comprises a switching point at which a level of the driving pulse is changed to drive said valve body in a direction to open the duty-cycle type solenoid valve.

12. An apparatus as defined in claim 11, wherein said ON/OFF switching point of said driving pulse comprises a switching point at which a level of the driving pulse is changed to drive said valve body in a direction to close the duty-cycle type solenoid valve.

13. An apparatus as defined in claim 11, wherein said predetermined time is determined depending upon the duty ratio of said driving pulse.

14. An apparatus as defined in claim 13, wherein said predetermined time is set to a longer period as an oil pressure that corresponds to the duty ratio is increased.

15. An apparatus as defined in claim 11, wherein the pulse width of said additional pulse is set to a larger value as said predetermined time is set to be a shorter period when an oil pressure is low, and is set to a larger value as said predetermined time is set to be a longer period when the oil pressure is high.

16. A control apparatus as defined in claim 11, wherein said additional pulse generating means generates said additional pulse when an oil pressure that corresponds to the duty ratio is not higher than a predetermined level.

* * * * *